(12) United States Patent
Taneja

(10) Patent No.: US 8,948,006 B2
(45) Date of Patent: Feb. 3, 2015

(54) SYSTEM FOR MANAGING UPLINK QUALITY OF SERVICE (QOS) IN CELLULAR NETWORK

(71) Applicant: Mukesh Taneja, Bangalore (IN)

(72) Inventor: Mukesh Taneja, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 145 days.

(21) Appl. No.: 13/735,050

(22) Filed: Jan. 7, 2013

(65) Prior Publication Data

US 2014/0192638 A1     Jul. 10, 2014

(51) Int. Cl.
*H04W 28/16*   (2009.01)
*H04W 28/02*   (2009.01)

(52) U.S. Cl.
CPC ................................. *H04W 28/0268* (2013.01)
USPC ........... 370/229; 370/230; 370/231; 370/235; 455/11.1

(58) Field of Classification Search
CPC .......... H04B 7/00; H04L 12/56; H04L 29/06; H04Q 7/00; H04W 24/00; H04W 24/10; H04W 28/02; H04W 28/16; H04W 52/14; H04W 72/04; H04W 72/12; H04W 74/08
USPC .............. 370/229–235.1, 246–252, 310–315, 370/329–331; 455/70, 11.1; 709/219
See application file for complete search history.

(56) References Cited

U.S. PATENT DOCUMENTS

| 7,948,936 | B2 | 5/2011 | Lohr | |
|---|---|---|---|---|
| 7,953,064 | B2 | 5/2011 | Ahluwalia | |
| 2005/0078651 | A1 | 4/2005 | Lee | |
| 2005/0271031 | A1 | 12/2005 | Cho | |
| 2011/0044192 | A1 | 2/2011 | Wang | |
| 2012/0044814 | A1* | 2/2012 | Natarajan et al. | 370/246 |
| 2013/0336236 | A1* | 12/2013 | Brus et al. | 370/329 |

OTHER PUBLICATIONS

Rui Wang, Vincent K.N. Lau and Huang Huang, Opportunistic Buffered Decode-Wait-and-Forward (OBOWF) Protocol for Mobile Wireless Relay Networks, IEEE Trans. Wireless Networks, Jan. 26, 2011.

* cited by examiner

*Primary Examiner* — Bob Phunkulh
*Assistant Examiner* — Wali Butt
(74) *Attorney, Agent, or Firm* — Charles Bergere

(57) ABSTRACT

A cellular communication system includes a method for managing uplink (UL) quality-of-service (QoS) in a two-hop wireless cellular communication system, including determining a count of UL QoS requests received from each user equipment (UE) and determining a served-to-requested ratio that is a ratio of a the number of bytes of UL data served to each UE by a mobile relay to the number bytes of UL data requested by each UE from the mobile relay. A UE subsystem of the mobile relay determines if any UEs are experiencing low UL QoS based on the number of UL QoS requests and the served-to-requested ratio. In response, a macro base station allocates network resources for improving the UL QoS provided to the set of UEs.

13 Claims, 5 Drawing Sheets

SYSTEM FOR MANAGING UPLINK QUALITY OF SERVICE (QOS) IN CELLULAR NETWORK

BACKGROUND OF THE INVENTION

The present invention generally relates to cellular communication systems, and, more particularly, to managing uplink (UL) Quality of Service (QoS) in cellular communication systems.

Cellular communication systems provide different types of mobile services including voice, data and multimedia services to users. A cellular communication system includes access points (e.g., macro base stations) to enable wireless connectivity for user equipments (UEs) serviced by the cellular communication system. The UEs often experience varying levels of signal quality depending on their physical location (e.g., indoors, in a basement, etc.) relative to a nearest access point in a particular geographical area. To ensure that UEs receive signals with consistent quality, small-coverage access points (also known as mobile relays) are provided to supplement conventional access points. A mobile relay includes base station and UE subsystems and repeats signals with robust quality to the UEs. The base station subsystem serves as a base station to the UEs and communicates with the UEs using a cellular protocol; the UE subsystem serves as a UE to the macro base station and communicates wirelessly (using a cellular protocol) with the macro base station. Such a cellular communication system is known as a two-hop wireless cellular communication system.

A macro base station may have several (one-hop) UEs that are connected directly and several two-hop UEs that are connected by way of mobile relays. To execute data intensive applications, the UEs are continually required to upload and download data from the internet using the communication system. In a one-hop system, the UE queues the uplink data (UL data) for uploading in a buffer from which the data is transmitted to the macro base station. A medium access control (MAC) scheduler at the macro base station allocates UL slots to each UE that is directly connected to it based on a service level agreement, a buffer occupancy status of the UE, channel conditions, network load, and fairness policies and ensures a UL QoS that meets the service level agreement. If a UE experiences a low UL QoS (e.g., due to channel conditions or high network load) and has excess data queued in its buffers, the MAC scheduler at the macro base station attempts to allocate additional UL slots for the UE to improve the QoS.

In a two-hop system, a UE connected to a macro base station may function as a mobile relay that has multiple UEs connected to it. Similar to the UEs in the one-hop system, the mobile relay provides a buffer occupancy status to the macro base station, which accordingly allocates network resources to the mobile relay. If a UE connected to the mobile relay experiences low UL QoS, the UE may be unable to transmit data to the mobile relay for uploading and consequently its data buffers may be filled. If the mobile relay does not receive upload data, the mobile relay buffers are not queued up and the buffer occupancy status transmitted by the mobile relay shows considerably less data than the actual amount pending for upload. The macro base station performs resource allocation based on the buffer occupancy status and therefore does not allocate enough resources to allow all of the UEs to upload the pending data. Thus, the UEs connected to the mobile relay continue to receive less-than-average UL QoS, which deteriorates the performance of latency sensitive applications.

Therefore, it would be advantageous to have a system for managing UL QoS in a two-hop wireless cellular communication system that ensures consistent UL QoS to two-hop UEs and that overcomes the above-mentioned limitations of conventional cellular communication systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
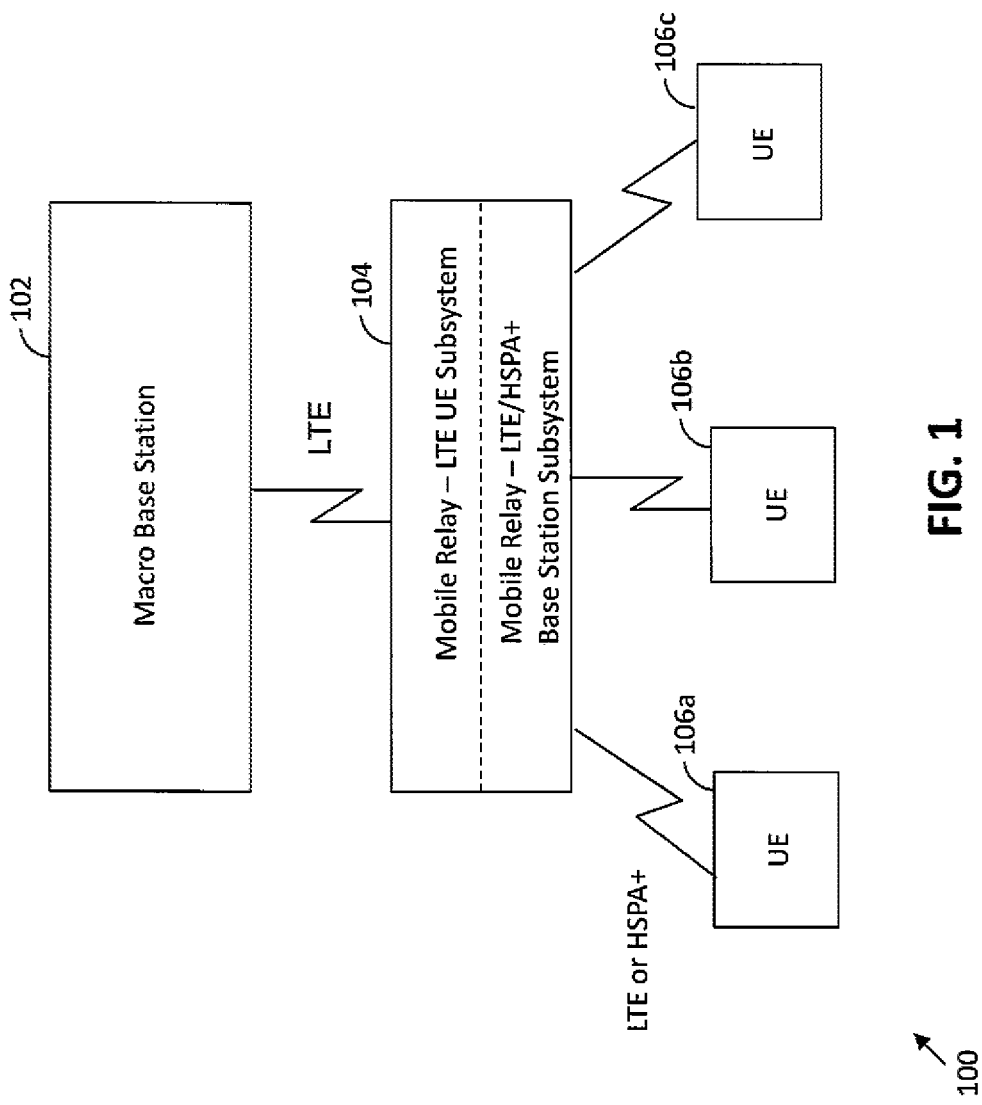
FIG. 1 is a schematic block diagram of a two-hop wireless cellular communication system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a cellular communication system is provided. The cellular communication system includes a macro base station that operates in accordance with a cellular protocol, a mobile relay that is in communication with the macro base station and a plurality of UEs. The mobile relay transmits UL QoS status to the macro base station. The UL QoS status corresponds to a first set of UEs that receive UL QoS below a predetermined level. The mobile relay determines for each UE in the first set of UEs that whether a count of UL QoS requests received from the UE is greater than a first predetermined value. The mobile relay also determines that whether a served-to-requested ratio that is a ratio of a count of bytes of UL data served to the UE by the mobile relay to a count of bytes of UL data requested by the UE from the mobile relay is less than a second predetermined value. The UL QoS status includes a buffer status packet that indicates occupancy of one or more buffers of the first set of UEs.

In another embodiment of the present invention, a method for regulating UL QoS in a cellular communication system is provided. The cellular communication system includes a core network, a macro base station in communication with the core network, at least one mobile relay in communication with the macro base station, and a plurality of user equipments (UEs) in communication with the at least one mobile relay. The method includes determining a count of UL QoS requests received from each UE. A served-to-requested ratio that is a ratio of a count of bytes of UL data served to each UE by the mobile relay to a count of bytes of UL data requested by each UE from the mobile relay is determined. A first set of UEs is determined by the base station subsystem of the mobile relay including one or more UEs that have the count of UL QoS requests greater than a first predetermined value and the served-to-requested ratio less than a second predetermined value. A UL QoS status corresponding to the first set of UEs is transmitted to the macro base station by the mobile relay. The UL QoS status includes a buffer status packet that indicates buffer occupancy of one or more buffers of the first set of UEs.

In yet another embodiment of the present invention, a method for regulating UL QoS in a cellular communication system is provided. The cellular communication system includes a core network, a macro base station in communication with the core network, at least one mobile relay in communication with the macro base station, and a plurality of user equipments (UEs) in communication with the mobile relay. The method includes initiating a connection request from a UE of the plurality of UEs for establishing an enhanced session between the UE and the core network by way of the macro base station. The connection request from the UE is held by the base station subsystem of the mobile relay until a connection between the UE subsystem of the mobile relay and the core network is established by way of the macro base station. A connection between the base station subsystem of the mobile relay and the UE subsystem of the mobile relay is established. The connection between the UE subsystem of the mobile relay and the core network is established by way of the macro base station. The connection request from the UE is released by the base station subsystem of the mobile relay when the connection between the UE subsystem of the mobile relay and the core network is established by way of the macro base station to establish the enhanced session. A count of uplink (UL) quality of service (QoS) requests received from each UE is determined. A served-to-requested ratio that is a ratio of a count of bytes of UL data served to each UE by the mobile relay to a count of bytes of UL data requested by each UE from the mobile relay is determined. A first set of UEs is determined by the base station subsystem of the mobile relay including one or more UEs that have the count of UL QoS requests greater than a first predetermined value and the served-to-requested ratio less than a second predetermined value. A buffer status packet including a UL QoS status corresponding to the first set of UEs is created by the UE subsystem of the mobile relay. The buffer status packet indicates a buffer occupancy of one or more buffers of the first set of UEs. The buffer status packet including the UL QoS status corresponding to the first set of UEs is transmitted to the macro base station by the mobile relay.

Various embodiments of the present invention provide a system and method for regulating UL QoS in two-hop wireless cellular communication systems. The method includes determining a count of UL QoS requests received from each UE and determining a served-to-requested ratio that is a ratio of a count of bytes of UL data served to each UE by the mobile relay to a count of bytes of UL data requested by each UE from the mobile relay. A UE subsystem of the mobile relay determines a set of UEs for which the count of UL QoS requests is greater than a first predetermined value and the served-to-requested ratio is less than a second predetermined value. The UE subsystem of the mobile relay transmits a UL QoS status to the macro base station that includes buffer occupancy status of buffers corresponding to the set of UEs. The UL QoS status informs the macro base station about the count of UEs that are experiencing low UL QoS based on which the macro base station allocates resources to the mobile relay to improve the UL QoS provided to the set of UEs. Since, there may be a large number of UEs (~100 UEs) connected to the mobile relay, transmitting buffer occupancy status of each UE to the macro base station requires considerable amount of resources and therefore is expensive. Thus, transmitting the buffer occupancy status corresponding to the UEs that are experiencing low UL QoS, i.e., the set of UEs, saves resources and is inexpensive.

Referring now to FIG. 1, a schematic diagram of a cellular communication system 100 in accordance with an embodiment of the present invention, is shown. The cellular communication system 100 includes a macro base station 102, a mobile relay 104, and a plurality of user equipments (UEs) including first through third UEs 106a-106c (collectively referred to as UEs 106).

The cellular communication system 100 is an example of a two-hop wireless cellular communication system in which the mobile relay 104 communicates by way of a wireless network with the macro base station 102. The mobile relay 104 includes a UE subsystem and a base station subsystem and communicates as a UE (by way of the UE subsystem) with the macro base station 104 and as a base station (by way of the base station subsystem) with the UEs 106. The mobile relay 104 obtains mobile telephony and data uplink (UL) and downlink (DL) services from the macro base station 102 and provides them to one or more UEs 106. In an embodiment of the present invention, the UE subsystem of the mobile relay 104 communicates with the macro base station 102 in accordance with long term evolution (LTE) cellular protocol and the base station subsystem of the mobile relay 104 communicates with the UEs 106 by way of at least one of high speed packet access+ (HSPA+) and LTE cellular protocols. The UEs 106 are wirelessly connected to the mobile relay 104 and may roam in a physical area while remaining connected with the mobile relay 104. Apart from the regular mobile telephony services, the UEs 106 may subscribe to one or more data/multimedia services including video conferencing that require continuous upload/download of data to/from the Internet. In an example, the first and second UEs 106a and 106b may be located in a basement of a building or at periphery of a coverage zone of the mobile relay 104 and having signal quality (signal strength) that is below a predetermined threshold. As a result, the first and second UEs 106a and 106b receive low UL quality-of-service (QoS) causing one or more buffers thereof to be excessively queued with data.

Each UE 106 generates and transmits UL QoS requests to the base station subsystem of the mobile relay 104. The UL QoS requests include a set of bits that indicate occupancy status of the corresponding one or more buffers of the UEs 106. For example, when the cellular protocol for communication between the base station subsystem of the mobile relay 104 and the first UE 106a is LTE, the UL QoS requests generated by the first UE 106a include a code (i.e., a buffer size index) indicating a range of a count of bytes pending for upload in the one or more buffers of the first UE 106a. When the cellular protocol for communication between the base station subsystem of the mobile relay 104 and the first UE 106a is HSPA+, the UL QoS requests generated by the first UE 106a include a happy bit which is set to unhappy (i.e. logic zero) if the first UE 106a is receiving sub-par UL QoS. The first UE 106a also indicates a count of bytes of UL data that it needs to upload in the UL QoS request. The base station subsystem of the mobile relay 104 receives the UL QoS requests from the UEs 106 and transmits the UL QoS requests to the UE subsystem of the mobile relay 104. The base station subsystem of the mobile relay 104 determines a set of UEs corresponding to a predetermined time duration for which a count of UL QoS requests received is greater than a first predetermined value and a served-to-requested ratio (that is a ratio of a count of bytes of UL data served and a count of bytes of UL data requested) is less than a second predetermined value. In an embodiment of the present invention, the first predetermined value is determined based on the applications running on the UEs 106. For example, if the first UE 106a is running a video conferencing application which is delay sensitive, the first predetermined value and the predetermined time duration for the first UE 106a will be set to 5 requests and 50 milliseconds (ms), respectively. If the second UE 106b is accessing the Internet for web-browsing, the first predetermined value and the predetermined time duration for the second UE 106b can be relaxed and set to 8 requests and 500 ms, respectively. The second predetermined value is determined based on a service level agreement between the first and second UEs 106a and 106b and their respective network operators.

The above two criteria ensure identification of UEs (the set of UEs) that receive low UL QoS. As the first and second UEs 106a and 106b receive low UL QoS, the UE subsystem of the mobile relay 104 identifies the first and second UEs 106a and 106b as those receiving low UL QoS based on the above criteria and therefore associates them with the set of UEs. The UE subsystem of the mobile relay 104 creates a buffer status packet (shown in FIG. 3) including a UL QoS status indicating occupancy status of the one or more buffers corresponding to the first and second UEs 106a and 106b. Additionally, the buffer status packet also includes occupancy status of one or more buffers of the UE subsystem of the mobile relay 104. The UE subsystem transmits the buffer status packet to the macro base station 102. Upon receiving the UL QoS status, the macro base station 102 is informed with an amount of UL data that is queued up in the buffers of the first and second UEs 106a and 106b due to poor UL QoS. The macro base station 102 performs resource allocation to the mobile relay 104 to ensure that the UL QoS provided to the first and second UEs 106a and 106b is improved and pending data queues in the corresponding one or more buffers are reduced.

Figure 2:
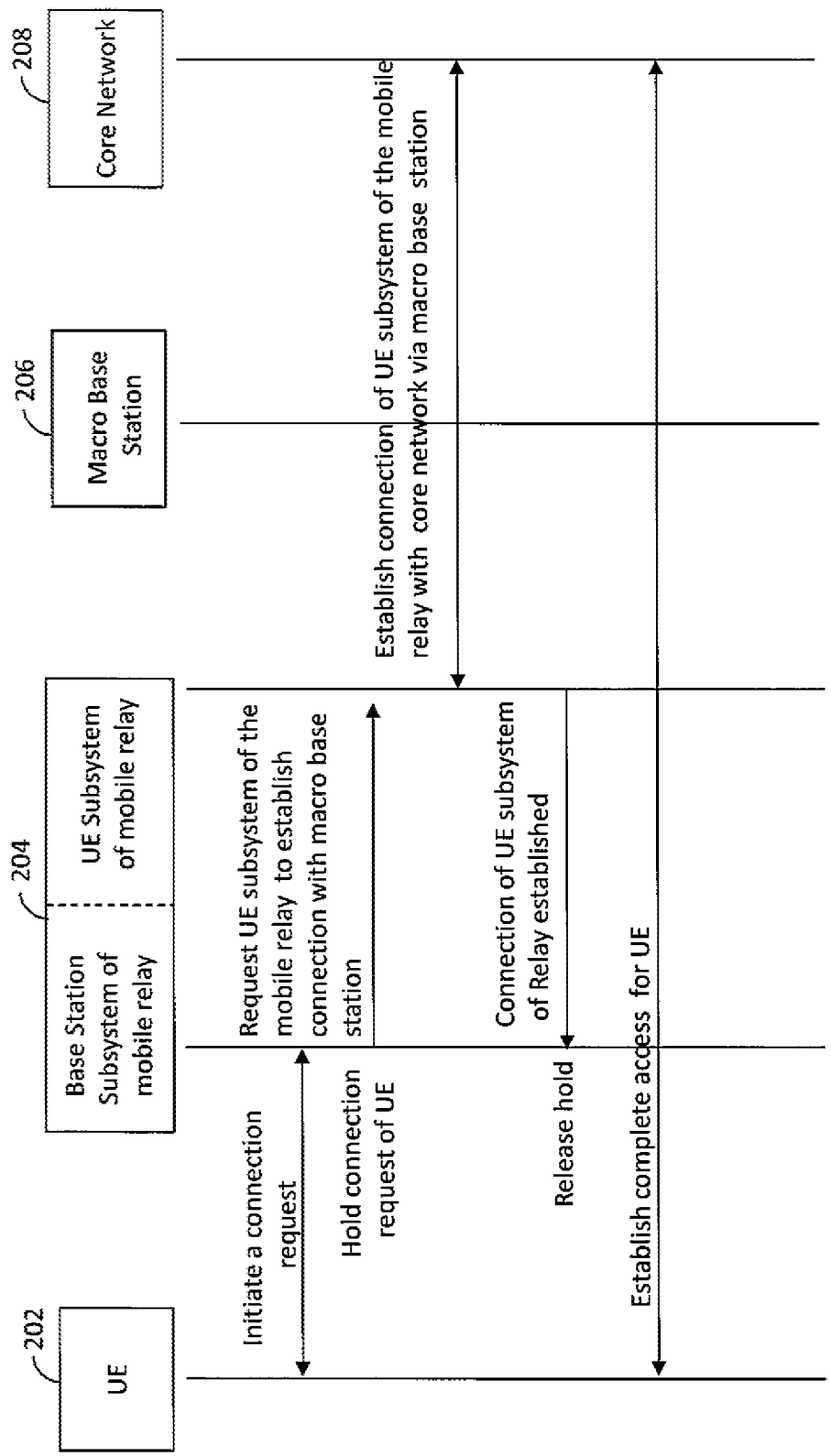
FIG. 2 is a chart depicting a signaling procedure for establishing an enhanced session between a UE, a mobile relay, and a macro base station in accordance with an embodiment of the present invention.

Referring now to FIG. 2, a schematic block diagram depicting a signaling procedure for establishing an enhanced session between a UE 202, a mobile relay 204, a macro base station 206, and a core network 208 in accordance with an embodiment of the present invention, is shown. In various embodiments of the present invention, the UE 202, the mobile relay 204 and the macro base station 206 are similar to UE 106, the mobile relay 104 and the macro base station 102 of FIG. 1.

The UE 202 initiates a connection request for establishing an enhanced session with the core network 208 by way of the macro base station 206 and transmits the connection request to the base station subsystem of the mobile relay 204. In an embodiment of the present invention, the UE 202 communicates with the mobile relay 204 in accordance with either the LTE or the HSPA+ cellular protocols. The base station subsystem of the mobile relay 204 receives and holds the connection request until a connection between the UE subsystem of the mobile relay 204 and the macro base station 206 is established. The base station subsystem of the mobile relay 204 establishes a connection with the UE subsystem of the mobile relay 204. In an embodiment of the present invention, the base station and UE subsystems of the mobile relay 204 communicate using a gigabit-Ethernet interface.

The UE subsystem of the mobile relay 204 establishes connection with the core network 208 by way of the macro base station 206. In an embodiment of the present invention, the UE subsystem of the mobile relay 204 and the macro base station 206 communicate in accordance with either of the LTE or the HSPA+ cellular protocols. The base station subsystem of the mobile relay 204 releases the hold on the connection request from the UE 202 when the connection between the UE subsystem of the mobile relay 204 and the core network 208 is established by way of the macro base station 206, which establishes the enhanced session of the UE 202 with the core network 208 by way of the macro base station 206. Subsequent to establishing the enhanced session the UE 202 begins to upload/download data to/from the core network 208 by way of the macro base station 206.

Figure 3:
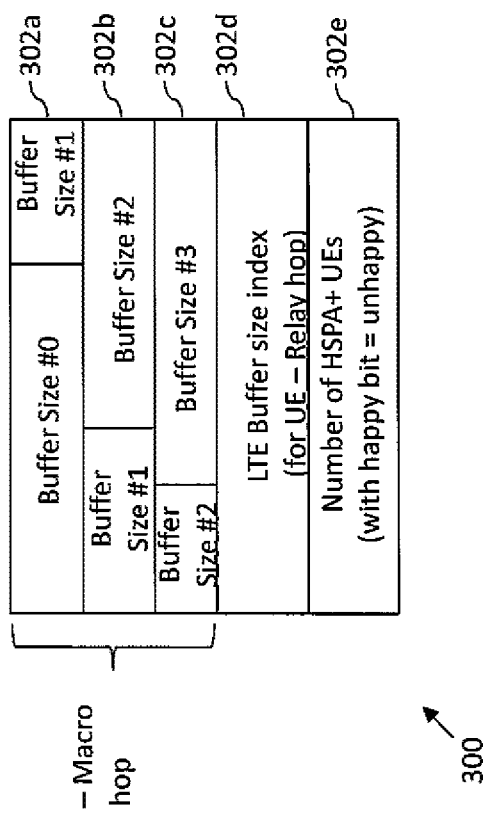
FIG. 3 is a schematic block diagram depicting a buffer status packet in accordance with an embodiment of the present invention.

Referring now to FIG. 3, a schematic block diagram depicting a buffer status packet 300 in accordance with an embodiment of the present invention is shown. The buffer status packet 300 includes first through fifth sets of bits 302a-302e.

The buffer status packet 300 is transmitted by the UE subsystem of the mobile relay 204 to the macro base station 206 and includes buffer occupancy status of the UE subsystem of the mobile relay 204. For example, the first through third sets of bits 302a-302c indicate buffer occupancy status of buffer 0 through buffer 2 of the UE subsystem of the mobile relay 204. The buffer status packet 300 also includes information related to buffer occupancy status of the set of UEs that do not receive appropriate levels of UL QoS. For example, the fourth and fifth sets of bits 302d and 302e indicate buffer occupancy status of the set of UEs when the communication protocol between the base station subsystem of the mobile relay 204 and the set of UEs is LTE and HSPA+, respectively. When the base station subsystem of the mobile relay 204 and the set of UEs communicate using LTE protocol, a buffer size index is determined (and transmitted through the fourth set of bits 302d) that corresponds to a range of a count of bytes pending for upload in the one or more buffers of the set of UEs that receive sub-par UL QoS. When the cellular protocol for communication between the base station subsystem of the mobile relay 204 and the set of UEs is HSPA+, the fifth set of bits 302e includes count of UEs (i.e., a count of UEs in the first set of UEs) that have the happy bit set to unhappy (i.e., logic zero). The macro base station 206 receives the buffer status packet 300 and performs appropriate resource allocation to improve UL QoS provided to the set of UEs.

Figure 4A:
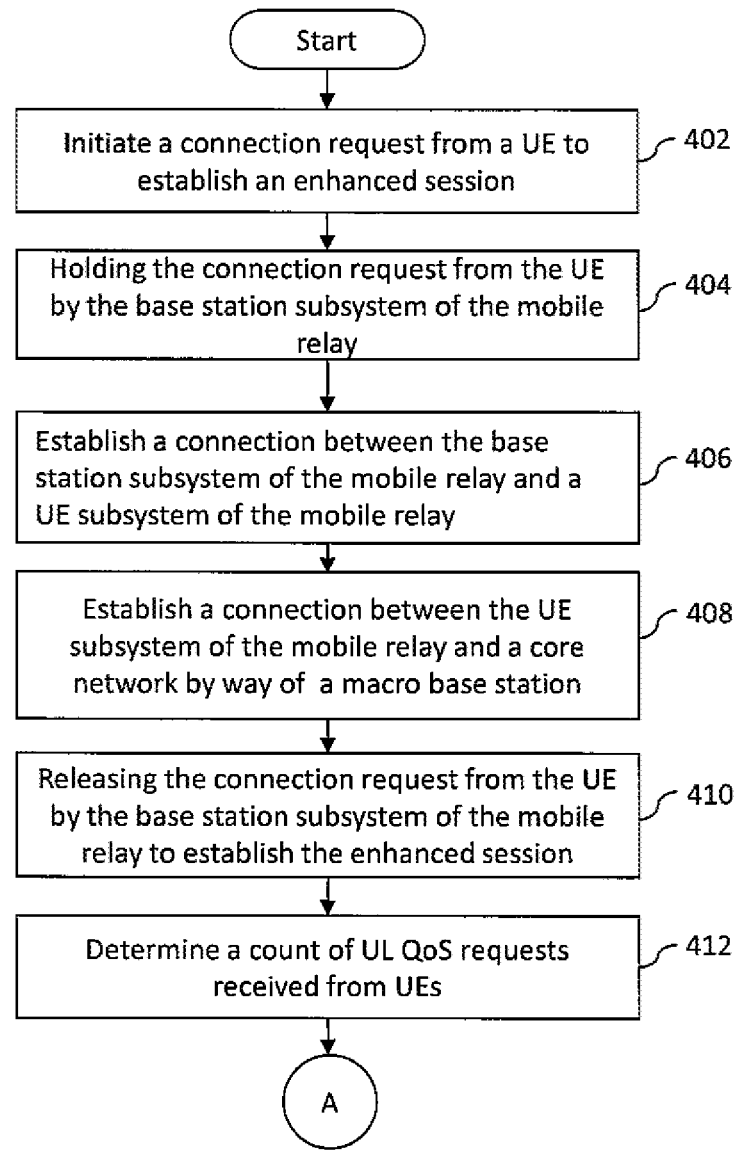
FIGS. 4A and 4B are flow charts depicting a method for managing UL QoS to UEs in a two-hop wireless cellular communication system in accordance with an embodiment of the present invention.
Figure 4B:
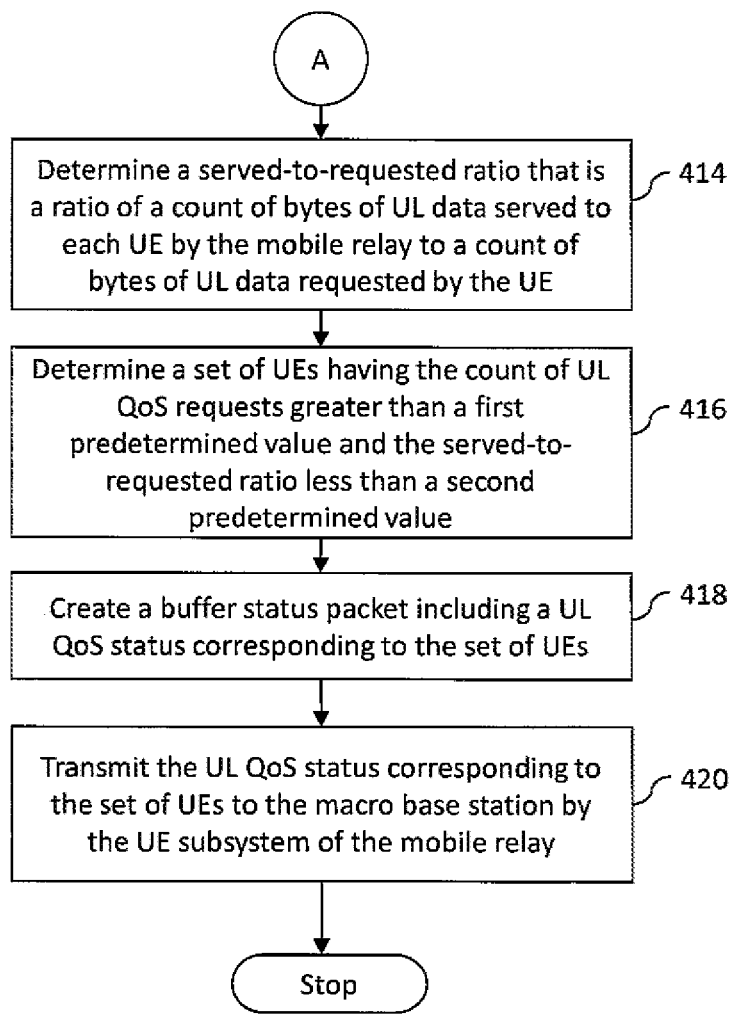

Referring now to FIGS. 4A and 4B, a flow chart depicting a method for regulating UL QoS in a two-hop wireless cellular communication system in accordance with an embodiment of the present invention, is shown.

At step 402, the UE 202 initiates a connection request for establishing the enhanced session with the core network 208 by way of the macro base station 206. The UE 202 transmits the connection request to the base station subsystem of the mobile relay 204. At step 404, the base station subsystem of the mobile relay 204 receives and holds the connection request from the UE 202 until a connection between the UE subsystem of the mobile relay 204 and the core network 208 is established by way of the macro base station 206. At step 406, the base station subsystem of the mobile relay 204 establishes a connection with the UE subsystem of the mobile relay 204. At step 408, the UE subsystem of the mobile relay 204 establishes the connection with the core network 208 by way of the macro base station 206.

At step 410, the base station subsystem of the mobile relay 204 releases the hold on the connection request from the UE 202 when the connection between the UE subsystem of the mobile relay 204 and the core network 208 is established by way of the macro base station 206, which initiates the enhanced session of the UE 202 with the core network 208. At step 412, a count of UL QoS requests received from each UE 106 is determined. In an embodiment of the present invention, the count of UL QoS requests is determined by the UE subsystem of the mobile relay 104 (the UE subsystem of the mobile relay 104 is similar to the UE subsystem of the mobile relay 204). At step 414, a served-to-requested ratio that is a ratio of a count of bytes of UL data served to each UE 106 by the mobile relay 104 to a count of bytes of UL data requested by each UE 106 from the mobile relay 104 is determined by the UE subsystem of the mobile relay 104. At step 416, a set of UEs having the count of UL QoS requests greater than a first predetermined value and the served-to-requested ratio less than a second predetermined value is determined by the base station subsystem of the mobile relay 104 (the base station subsystem of the mobile relay 104 is similar to the base station subsystem of the mobile relay 204). At step 418, the buffer status packet 300 including a UL QoS status corresponding to the set of UEs is created. The UL QoS status indicates buffer occupancy of one or more buffers of the set of UEs. At step 420, the UE subsystem of the mobile relay 204 transmits the buffer status packet 300 corresponding to the set of UEs to the macro base station 102. The macro base station 102 performs resource management and improves the UL QoS provided to the set of UEs.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A cellular communication system, comprising:
a macro base station that operates in accordance with a cellular protocol; and
at least one mobile relay in communication with the macro base station and a plurality of user equipments (UEs), wherein the at least one mobile relay transmits uplink (UL) quality of service (QoS) status to the macro base station, the UL QoS status corresponding to a first set of UEs that receive UL QoS below a predetermined level, wherein for each UE of the first set of UEs, a count of UL QoS requests received from the UE by the at least one mobile relay is greater than a first predetermined value and a served-to-requested ratio that is a ratio of a count of bytes of UL data served to the UE by the at least one mobile relay to a count of bytes of UL data requested by the UE from the at least one mobile relay is less than a second predetermined value,
wherein the UL QoS status is transmitted as a buffer status packet that indicates occupancy of one or more buffers of the first set of UEs,
wherein the cellular protocol includes at least one of High Speed Packet Access+ (HSPA+) cellular protocol and Long Term Evolution (LTE) cellular protocol,
wherein for the HSPA+ cellular protocol, the buffer status packet includes a predetermined bit count that indicates a count of bytes stored in the one or more buffers of the first set of UEs that have a happy bit set to unhappy status, and
wherein for the LTE cellular protocol, the buffer status packet includes a predetermined count of bits that indicates a count of bytes stored in the one or more buffers of the first set of UEs.

2. The cellular communication system of claim 1, wherein the at least one mobile relay includes a UE subsystem and a base station subsystem, wherein the UE subsystem of the at least one mobile relay communicates with the macro base station and the base station subsystem communicates with the plurality of UEs.

3. The cellular communication system of claim 2, wherein the base station subsystem determines the first set of UEs.

4. The cellular communication system of claim 3, wherein the UE subsystem of the at least one mobile relay transmits the UL QoS status as the buffer status packet to the macro base station.

5. The cellular communication system of claim 1, wherein the first set of UEs is determined based on a predetermined time duration.

6. A method for regulating uplink (UL) quality of service (QoS) in a cellular communication system including a core network, a macro base station that communicates over the core network, at least one mobile relay in communication with the macro base station, and a plurality of user equipments (UEs) in communication with the at least one mobile relay, the method comprising:
generating a count of uplink (UL) quality of service (QoS) requests received from each UE;
determining a served-to-requested ratio that is a ratio of a byte count of UL data served to each UE by the at least one mobile relay to a byte count of UL data requested by each UE from the at least one mobile relay;
determining a first set of UEs that have the count of UL QoS requests that is greater than a first predetermined value and the served-to-requested ratio that is less than a second predetermined value;
creating a buffer status packet including a UL QoS status corresponding to the first set of UEs of the at least one mobile relay, wherein the UL QoS status indicates a buffer occupancy of one or more buffers of the first set of UEs,
wherein the macro base station, the at least one mobile relay, and the plurality of UEs operate in accordance with a cellular protocol that includes at least one of High Speed Packet Access (HSPA+) cellular protocol and Long Term Evolution (LTE) cellular protocol,
wherein for the HSPA+ cellular protocol, the buffer status packet includes a predetermined bit count that indicates a count of bytes stored in the one or more buffers of the first set of UEs that have a happy bit set to unhappy status, and
wherein for the LTE cellular protocol, the buffer status packet includes a predetermined count of bits that indicates a count of bytes stored in the one or more buffers of the first set of UEs; and
transmitting the buffer status packet from the at least one mobile relay to the macro base station.

7. The method of claim 6, wherein the at least one mobile relay includes a UE subsystem and a base station subsystem, wherein the UE subsystem communicates with the macro base station and the base station subsystem communicates with the plurality of UEs.

8. The method of claim 7, wherein the base station subsystem determines the first set of UEs.

9. The method of claim 8, wherein the UE subsystem of transmits the buffer status packet including the UL QoS status corresponding to the first set of UEs to the macro base station.

10. The method of claim 6, further comprising establishing an enhanced session between the plurality of UEs and the macro base station by way of the at least one mobile relay.

11. The method of claim 10, wherein establishing the enhanced session further comprises:

initiating a connection request from a UE of the plurality of UEs for establishing an enhanced session between the UE and the core network by way of the macro base station;

holding the connection request from the UE by the base station subsystem of the at least one mobile relay until a connection between the UE subsystem of the at least one mobile relay and the core network is established by way of the macro base station;

establishing a connection between the base station and UE subsystems of the at least one mobile relay;

establishing the connection between the UE subsystem of the at least one mobile relay and the core network by way of the macro base station; and releasing the connection request from the UE by the base station subsystem of the at least one mobile relay when the connection between the UE subsystem of the at least one mobile relay and the core network is established by way of the macro base station to establish the enhanced session.

12. The method of claim 6, wherein the first set of UEs is determined based on a predetermined duration of time.

13. A method for regulating uplink (UL) quality of service (QoS) in a cellular communication system including a core network, a macro base station in communication with the core network, at least one mobile relay in communication with the macro base station, and a plurality of user equipments (UEs) in communication with the at least one mobile relay, the method comprising:

initiating a connection request from a UE of the plurality of UEs for establishing an enhanced session between the UE and the core network by way of the macro base station;

holding the connection request from the UE by the at least one mobile relay until a connection between the at least one mobile relay and the core network is established by way of the macro base station;

establishing a connection between the macro base station and a UE subsystem of the at least one mobile relay, thereby establishing a connection between the UE subsystem of the at least one mobile relay and the core network by way of the macro base station;

releasing the connection request from the UE by the base station subsystem of the at least one mobile relay when the connection between the UE subsystem of the at least one mobile relay and the core network is established;

generating a count of uplink (UL) quality of service (QoS) requests received from each UE;

determining a served-to-requested ratio that is a ratio of a count of bytes of UL data served to each UE by the at least one mobile relay to a count of bytes of UL data requested by each UE from the at least one mobile relay;

determining a first set of UEs by the base station subsystem of the at least one mobile relay having the count of UL QoS requests greater than a first predetermined value and the served-to-requested ratio less than a second predetermined value;

creating a buffer status packet including a UL QoS status for the first set of UEs by the UE subsystem of the at least one mobile relay, wherein the buffer status packet indicates a buffer occupancy of one or more buffers of the first set of UEs, wherein the macro base station, the at least one mobile relay, and the plurality of UEs operate in accordance with a cellular protocol that includes at least one of High Speed Packet Access (HSPA+) cellular protocol and Long Term Evolution (LTE) cellular protocol, wherein for the HSPA+ cellular protocol, the buffer status packet includes a predetermined bit count that indicates a count of bytes stored in the one or more buffers of the first set of UEs that have a happy bit set to unhappy status, and wherein for the LTE cellular protocol, the buffer status packet includes a predetermined count of bits that indicates a count of bytes stored in the one or more buffers of the first set of UEs; and transmitting the buffer status packet by the UE subsystem of the at least one mobile relay to the macro base station.

* * * * *